3,361,788
PERHALOINDONECARBOXYLIC ACID ESTERS AND 2 - (TRICHLOROVINYL) TRICHLOROISO- PHTHALIC ACID AND ESTERS
Edward D. Weil, Lewiston, N.Y., assignor to Hooker Chemical Corporation, Niagara Falls, N.Y., a corporation of New York
No Drawing. Filed Nov. 30, 1962, Ser. No. 241,118
11 Claims. (Cl. 260—469)

The present invention relates to new and useful esters having the indene skeleton.

The new esters of the invention may be described by the formula:

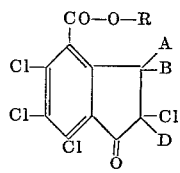

where R represents a monovalent organic group, A represents a chlorine, bromine, amino, or substituted amino substituent, and where B and D represent either chlorine, bromine, or the termini of a bond connecting the carbon atoms to which B and D are shown to be attached. As is seen from the description of A, above, an equivalent halogen, such as bromine may be employed in place of chlorine to obtain a similarly useful product. Thus Cl may be replaced in the formula by X for suitable halogen.

The invention encompasses new esters of the types:

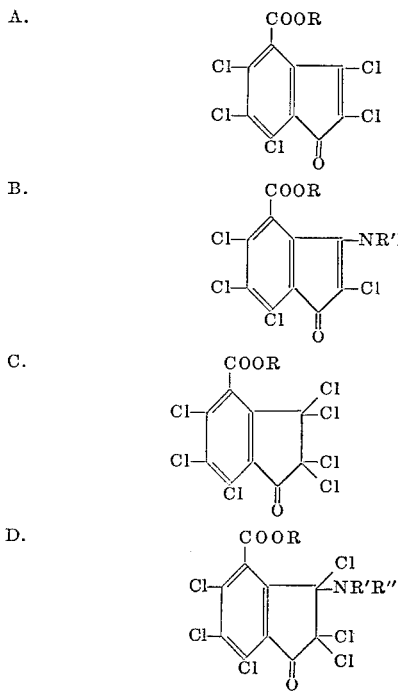

where R' and R" are defined as hydrogen, alkyl, aryl, or acyl substituents. Suitable halogens, preferably bromine, may replace chlorine in the structures shown. Alkyl substituents having from one to twenty carbon atoms are preferred in the present invention. The preferred alkyl groups may be unsubstituted or substituted by lower alkenyl, lower alkoxy, amino, or by an amino group which is itself substituted by an indene skeleton of the type contemplated herein. In the latter case, a compound results having two indene skeletons, joined through the amino group of each by an alkylene group. Other divalent linking groups may be substituted for alkylene such as aromatic, for example, phenylene. In addition to the alkyl substituents being of one to twenty carbon atoms, it is generally preferred that R, R' and R" be of such carbon content, if R' and R" contain any carbon and that R' and R" be of zero to six carbon atoms, whether R, R' and/or R" are alkyl, aryl, acyl or other permissible group.

Aryl substituents preferred for use in the present invention include phenyl, benzyl, naphthyl, and lower alkyl and chlorinated derivatives thereof.

The acyl substituents preferred are those derived from aliphatic and aromatic carboxylic acids including benzoic acid and chlorined and lower alkyl derivatives thereof.

R' and R" may be conjoined to form divalent linking radicals to form cyclic amino substituents. The divalent organic radicals may contain oxygen, sulphur, or phosphorus atoms as well as carbon. Specific examples include morpholino, pyrrolidino, piperidino, piperazino, and aziridinyl radicals.

Specific examples of compounds of the types described above include the following:

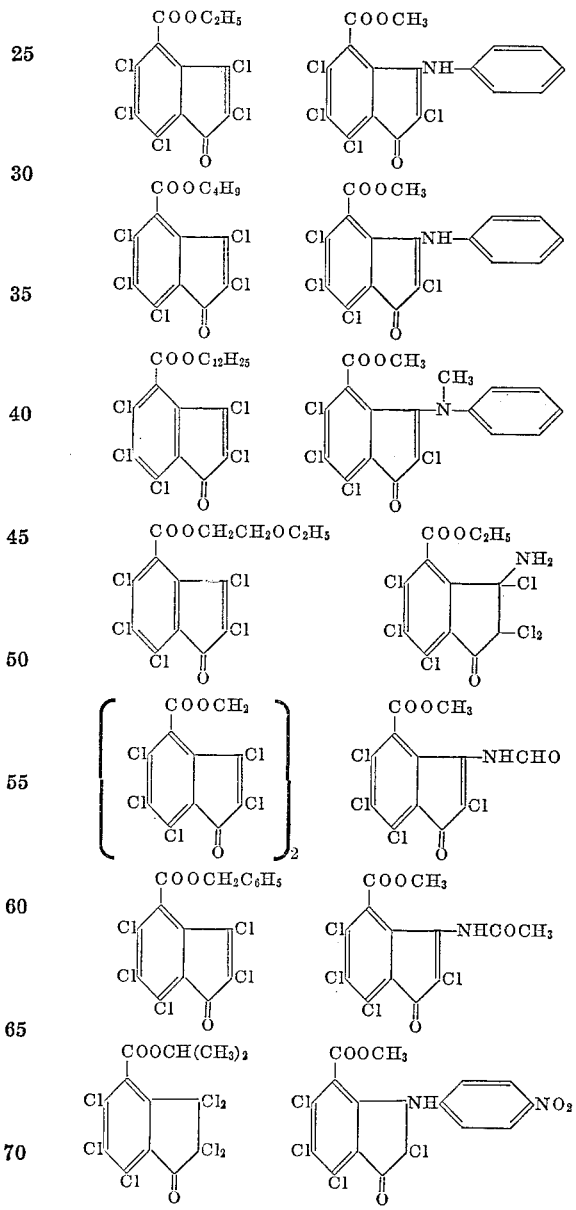

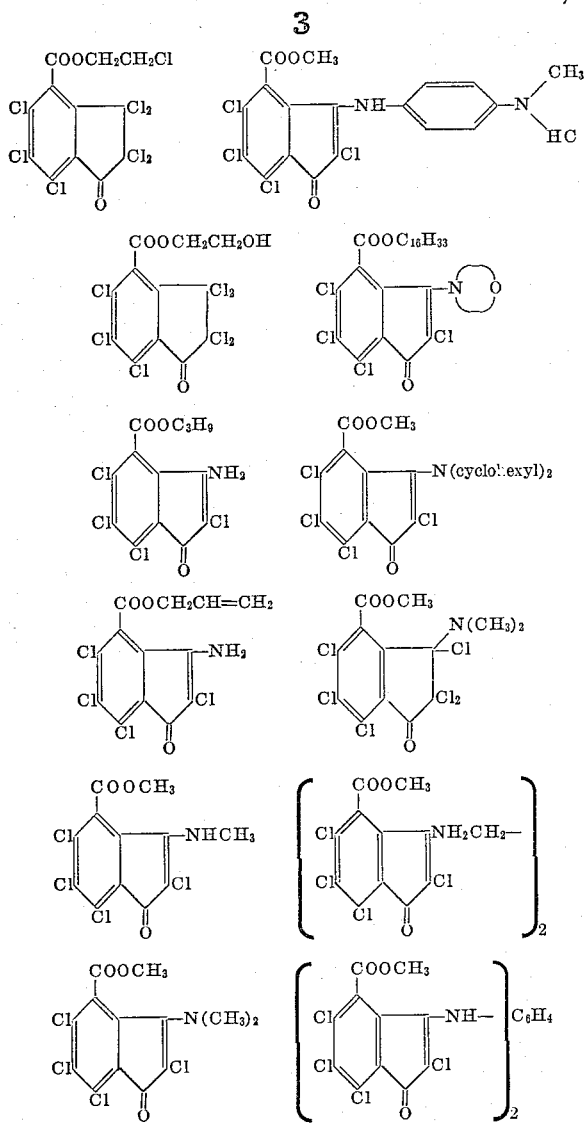

The novel compounds of the present invention may be prepared from the reaction products of octachloro-3a,4,7,7a-tetrahydro-4,7-methanoindene-1,8-dione (I) with an alcohol (ROH). The reaction forming compounds of structure (II) (the starting materials for the present invention and which are in themselves fundicidal) is as follows:

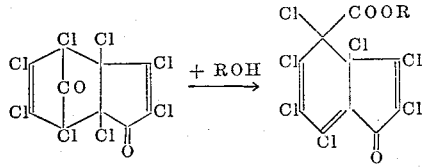

The new compounds of the invention wherein A is chlorine and B and D represent the termini of a bond connecting the carbon atoms to which B and D are attached are formed as follows. Compounds of structure (II) are treated with a halogen- or chlorine-abstracting agent, which may be (a) an inorganic iodide such as NaI or KI, (b) an element capable of combining with chlorine such as zinc, iron, aluminum, nickel, copper, or sulfur, (c) a lower valence salt of a metal having a stable higher valence, such as $SnCl_2$, $FeCl_2$, $CrCl_2$, $TiCl_3$, CuCl, (d) hydrogen in the presence of a hydrogenation catalyst such as platinum, palladium, or nickel, or (e) a substance which breaks down under the reaction conditions to yield hydrogen, such as hydrazine or dihydronaphthalene. A particularly convenient method, preferred because of rapidity and completeness, is treatment of compounds of structure (II) with sodium iodide in acetone at ambient or near-ambient temperatures.

The compounds of the invention where A is an amino or substituted amino (R'R''N where R' and R'' are chosen from the group comprising hydrogen, aryl, alkyl, or acyl substituents) and where B and D are the termini of a bond are prepared by reaction of the corresponding compounds where A is chlorine (and B and D are the termini of a bond) with ammonia or the appropriate amine (R'R''NH, where R' and R'' are aryl or alkyl substituents). Where R' or R'' is acyl, the corresponding compound with R' or R'' equal to hydrogen is first prepared and this intermediate then contacted with an acylating agent R'COCl, R'CO—O—COR', R''COCl,

R''CO—O—COR''

R'COOH, or R''COOH (the last two under dehydrating conditions). The reaction of the perchloroesters where A is chloro (and B and D the termini of a bond) with ammonia or an amine is readily conducted by contacting the reactants at about —20° to +150° centigrade, conveniently 0–120° centigrade, preferably in an inert solvent such as benzene, toluene, alcohol, acetone, dioxane, ethyl acetate, or the like. The released HCl may be captured by an extra mole of the ammonia or amine, or by another base such as sodium acetate, pyridine, triethylamine, soda ash, or the like.

The compounds of the invention where A is amino or chlorine, and where B and D are chlorine are prepared by chlorination of the corresponding compounds where B and D are the termini of a bond, by introducing chlorine or a chlorinating agent such as sulfuryl chloride or phosphorus pentachloride into the olefinic compound, conveniently dissolved in a chlorine-resistant solvent such as glacial acetic acid, carbon tetrachloride, trichlorobenzene, and the like.

It has further surprisingly been found that the compounds of the invention wherein A, B, and D are chlorine may be prepared directly in good yield by the heating of compounds of the structure

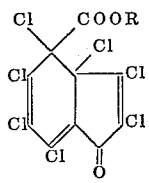

in the presence of a chlorinating agent, preferably chlorine and preferably in a chlorine-resistant solvent such as acetic acid, chlorinated hydrocarbons, or the like. Temperatures of from about fifty degrees centigrade to about one hundred fifty degrees centigrade are suitable for this process. In place of chlorine itself, a chlorinating agent such as sulfuryl chloride, phosphorus pentachloride, or the like may be used. It is to be noted that the reaction does not result in a more highly chlorinated product as would have been predicted, but actually amounts to a rearrangement or shift of two chlorine atoms. In other words, the chlorinating agent appears to be acting as a catalyst instead of a chlorinating agent as such.

A further process for the production of compounds of the structure

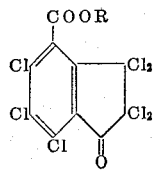

consists of heating compounds of the structure

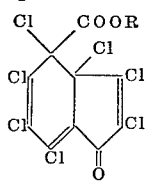

(the reaction products of octachloro-3a,4,7,7a-tetrahydro-4,7-methanoindene-1,8-dione with alcohols) at temperatures of eighty to one hundred fifty degrees centigrade for several hours to several days or at one hundred fifty to two hundred fifty degrees centigrade for 0.1 minute to several hours. Below the melting point of the starting material, it is preferred to use a solvent which should be chlorine-resistant, for example glacial acetic acid, chlorobenzene, or the like. In the one hundred fifty to two hundred fifty

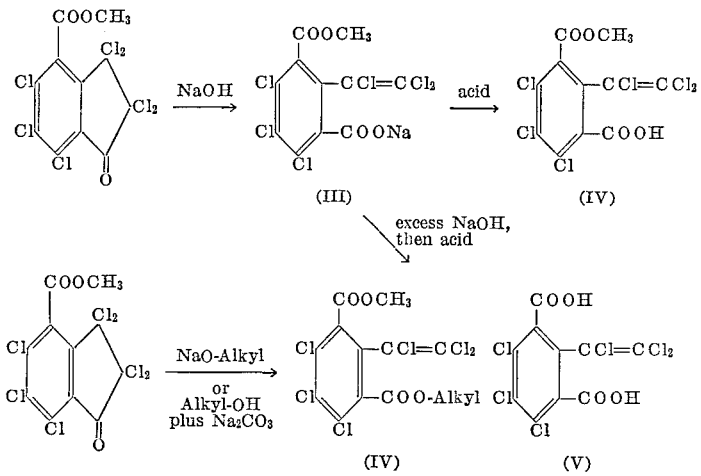

(III)    (IV)

(IV)    (V)

degrees centigrade range, at the lower end, reaction times of one to several hours are preferred; at the high end of this range reaction times of 0.1 minute to several minutes are preferred. At reaction times or temperatures in excess of these ranges, the product of the reaction is primarily perchloroindone. Below this range of temperatures, the rate of reaction is essentially nil. At any given temperature within the indicated range, it is advantageous to analyze the product from time to time by infrared absorption devices or other means, and to terminate the reaction when perchloroindone begins to appear in undesirably large amounts.

The reaction described above is a rearrangement with no net gain or loss of chlorine.

In the above reactions other suitable halogens and halogenating agents, such as bromine, may find use too. The new compounds of the invention have been found to have a high order of fungicidal activity. This is particularly surprising in that somewhat related structures such as esters of trihalobenzoic acid and perhaloindone, e.g., trichlorobenzoic acid and perchloroindone, are not appreciably active in this respect.

Also surprising in view of the drab yellowish-orange color of perchloroindone is the brilliant canary yellow color of the esters of the invention wherein B and D are the termini of a bond, A is chlorine, and the halogens are also chlorine. This effect of the ester grouping could not have been predicted, since the ester grouping is not generally a chromophoric group. These esters have utility as yellow pigments.

Suitable alcohols from which the R group of the products may be derived are in general any alcohol, but preferably aliphatic alcohols such as methanol, ethanol, butanol, isopropanol, allyl alcohol, lauryl alcohol, Cellosolve alcohols, cyclohexanol, benzyl alcohol, 2-choroethanol, ethylene glycol, sorbitol, pentaerythritol, propargyl alcohol, etc. Even large or complex compounds, provided that they possess alcoholic groupings may be used, for example sucrose, polyvinyl alcohol, or cellulose. Thus the concept of the invention extends to attaching the chromophoric perchloroindone structure to cellulose by following the reaction of the invention wherein R is the cellulose monomer unit less one alcoholic —OH group.

A use for the compounds of the invention is as chemical intermediates. They can, for example, be converted to the free acids, the acid chlorides, or the amides, or to derivatives in which chlorine atoms on the aromatic ring are replaced by groups such as hydroxy or alkoxy by reaction with OH or alkoxides.

A particularly surprising and valuable conversion is the reaction of the compounds of the invention, wherein A, B, and D are halogen, e.g., chlorine, with bases such as sodium (or other metal) hydroxide or sodium (or other metal) alkoxide, as follows:

Compounds of types (IV) and (V) may be represented by the formula

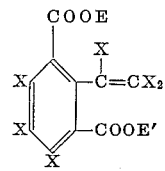

wherein X is halogen and E and E' are hydrogen or alkyl, preferably lower alkyl of one to ten or one to four carbon atoms. They are also novel and may be considered as a part of this invention.

Similarly,

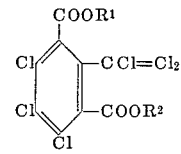

may be made by reacting

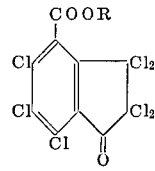

wherein R is a monovalent organic radical, with a reactant selected from the group consisting of (1) a base of formula $MOR^2$ and (2) a non-basic compound of formula $R^2OH$, plus a base, wherein M is a metal cation and $R^1$ and $R^2$ are selected from the group consisting of hydrogen, M and R. M is preferably alkali metal, e.g., sodium, potassium, and R is preferably lower alkyl.

The inability of the resultant acid-ester to form a cyclic anhydride upon strong heating constitutes the proof of structure of the compounds of the invention in regard to the orientation of the ketone carbonyl group relative to the carbalkoxy, since if the carbalkoxy group were located in the 7-position (ketone carbonyl being at the 1 position), the resultant compound from the above ring openings would be derivatives of an ortho-phthalic acid and would be extremely susceptible to cyclic anhydride formation, which is contrary to the experimental evidence.

The 2-(trichlorovinyl) trichloroisophthalic acid and its derivatives, made as described above, are useful as herbicides and fire retardants and as monomers for non-inflammable polyester resins. For example, heating the acid with ethylene glycol under esterification conditions (elimination of water) or heating the diester with ethylene glycol (elimination of alcohol) yields such resins.

In order to illustrate the invention, the following examples are given by way of illustration, without intent to limit same.

*Example 1.—Reaction of octachloro-3a,4,7,7a-tetrahydro-4,7-methanoindene-1,8-dione with methanol to prepare precursor for 4-carbomethoxy pentachloroindone*

25.4 grams of octachloro-3a,4,7,7a-tetrahydro-4,7-methanoindene-1,8-dione was refluxed with 100 ml. of methanol. After one half hour, the reaction mixture was chilled and the resultant crystalline precipitate removed by filtration to obtain 13 grams of pale yellow crystals, M.P. one hundred twenty-four to one hundred thirty degrees centigrade (A). This product after recrystallization from benzene-methanol mixture melted at one hundred thirty-six degrees centigrade.

*Analysis.*—Calcd. for $C_{11}H_3O_3Cl_7$: C, 30.63; H, 0.70; Cl, 57.54. Found: C, 30.7; H, 0.84, Cl, 57.6.

The infrared spectrum (Nujol mull) showed bands at 5.67 s., 5.83 s., 6.15 s., 6.31 m., 6.52 s., 6.94 m. 8.0 s., 8.17 s., 8.28 m., 8.85 w., 9.16 s., 10.01 m., 10.11 m., 10.45 s., 10.73 w., 11.28 w., 11.47 m., 12.08 m., 12.52 w., 12.78 m., 12.92 s., 13.24 m., 13.96 s., 14.82 m. (microns).

The figures pertaining to infrared absorption refer to microns and the small letters used in conjunction with the figures have the following significance: w. corresponds to weak; m. to medium; s. to slight, and v. to very.

*Example 2.—Preparation of 4-carbomethoxypentachloroindone*

To a solution of 30 grams of the methanol-octachlorotetrahydromethanoindenedione Product A of Example 1, dissolved in 500 ml. of acetone at twenty-five degrees centigrade, was added a solution of 100 grams of sodium iodide in 500 ml. of acetone. Iodine was evolved immediately. An aliquot was taken 15 seconds after admixture, rapidly added to excess water to quench the reaction by causing precipitation of the organic reactant, and the iodine quickly titrated with 0.1-N sodium thiosulfate. It was found that 99.6–100 percent of the theoretical one mole of iodine per mole of organic reactant had been evolved. A further aliquot held for one hour before quenching and titration showed 1.02 mole of iodine per mole of organic reactant. The bulk of the reaction mixture was worked up after 15 minutes, by addition of water, the precipitated solids being removed by filtration and washed with water until the washings were colorless. The crude product was a brilliant yellow crystalline solid having a melting point of 154.5 to 155 degrees centigrade and being obtained in a yield of 23 grams (corrected for aliquots). The product is soluble in hot benzene, and moderately soluble in hot heptane. Recrystallization from the latter yield 21 grams yellow crystals, M.P. 157.8 degrees centigrade.

*Analysis*—Calcd. for $C_{11}H_3O_3Cl_5$: Cl, 49.3. Found: Cl, 49.1.

*Example 3.—Preparation of 4-carbomethoxyheptachlorohydrindone (B)*

Chlorine gas was passed into a solution of 30 grams of the indone A of Example 1 in 300 ml. of glacial acetic acid at ninety-five to one hundred degrees centigrade (steam bath) for 63 hours. The solution was then poured into 2 liters of water, the gummy precipitate extracted with methylene chloride, the extract washed, dried over calcium chloride, and evaporated. The residue was recrystallized from heptane (charcoal treatment) to obtain 19 grams of colorless prisms, M.P. one hundred two to one hundred three degrees centigrade; infrared carbonyl band (Nujol mull) at 5.71 (5.68 shoulder), C=C band at 6.36.

*Analysis.*—Calcd. for $C_{11}H_3O_3Cl_7$: Cl, 57.54. Found: Cl, 57.4.

To 0.317 gram B in 50 cc. acetone was added 25.00 cc. 0.1003-N NaOH. After one hour, the solution was back-titrated with 0.1 N HCl, indicating the consumption of 1 milliequivalent of NaOH per 214 mg. of B (theory, 215.7 mg./meq.). A similar experiment in which the alkaline solution was subjected to Volhard titration indicated the release of 1 milliequivalent of chloride per 428 mg. of B (theory, 431.5 mg./meq.).

*Example 4.—Preparation of 2-(trichlorovinyl)-4,5,6-tri-chloroisophthalic acid monomethyl ester*

To a solution of 2.07 grams of the hydrindone B of the preceding example in 100 ml. of acetone was added 100 ml. of 0.1 N aqueous sodium hydroxide. After about 15 minutes the solution was titrated with 0.1 N aqueous hydrochloric acid to a phenolphthalein end point. The reaction mixture was then concentrated to a small volume to remove the acetone, filtered with a small amount of charcoal, and the clear filtrate acidified strongly with hydrochloric acid. The precipitate was removed by filtration and recrystallized from benzene-heptane mixture to obtain 0.7 gram of colorless crystals, M.P. one hundred forty-nine to one hundred fifty degrees centigrade.

*Analysis.*—Calcd. for $C_{11}H_4O_4Cl_6$: Cl, 51.53; neutralization equiv., 412.5. Found: Cl, 51.2; neutralization equiv., 410.5.

The infrared spectrum (Nujol mull) exhibited bands at 3.41 s., 5.71 m., 5.79 s., 6.04 w., 6.08 w., 6.25 w., 6.46 m., 7.73 s., 8.07 v.s., 8.37 w., 8.69 m., 9.71 w., 10.20 w., 10.66 m., 10.96 m., 11.15 w., 11.64 m., 12.26 m., 14.02 w.

*Example 5.—Preparation of 3-amino-4-carbomethoxy-2,5,6,7-tetrachloroindone-1*

5 grams of 4-carbomethoxypentachlorindone dissolved in 200 ml. of benzene was treated with gaseous ammonia for 1¼ hour. The precipitate was filtered out and washed with water, benzene and warm acetic acid, leaving undissolved 4.3 grams of red needles, M.P. two hundred forty-one degrees centigrade (decomp.).

*Analysis.*—Calcd. for $C_{11}H_5O_3NCl_4$: Cl, 41.6; N, 4.11. Found: Cl, 41.6; N, 3.88.

*Example 6.—Preparation of 3-anilino-4-carbomethoxy-2,5,6,7-tetrachloroindone-1*

0.5 gram of 4-carbomethoxypentachloroindone and one ml. of aniline were heated in benzene-methanol solution on the steam bath for one hour, the mixture evaporated to dryness, and the residue leached with water. The insoluble product was recrystallized from aqueous acetic acid to obtain 0.5 gram of red crystalline product, M.P. one hundred seventy-one to one hundred seventy-three degrees centigrade.

*Analysis.*—Calcd. for $C_{17}H_9O_3NCl_4$: N, 3.36. Found: N, 3.27.

*Example 7.—Preparation of 3-morpholino-4-carbomethoxy-2,5,6,7-tetrachloroindone-1*

0.5 gram of 4-carbomethoxypentachloroindone and 0.5 gram of morpholine were heated in benzene-methanol solution on the steam bath for one hour, the mixture then evaporated to dryness, and the residue leached with water. The insoluble product was recrystallized from benzene-heptane mixture to obtain 0.4 gram of red needles, M.P. one hundred sixty-eight to one hundred sixty-nine degrees centigrade.

*Analysis.*—Calcd. for $C_{15}H_{11}O_4NCl_4$: N, 3.41. Found: N, 3.2.

*Example 8.—Preparation of 2-trichlorovinyl-4,5,6-trichloroisophthalic acid dimethyl ester*

A solution of 2.1 grams of the hydrindone of Example 3 in 50 cc. methanol was refluxed with one gram anhydrous sodium carbonate for 40 minutes, then cooled, diluted with several volumes of water, and the precipitated product removed by filtration. The filtrate by Volhard titration was found to contain the theoretical one mole of chloride ion per mole of hydrindone employed. The organic product was colorless crystalline solid, M.P. eighty-eight to eighty-nine degrees centigrade (from aqueous methanol).

*Analysis.*—Calcd. for $C_{12}H_6O_4Cl_6$: Cl, 49.8. Found: Cl, 49.3.

*Example 9.—Product of octachloro-3a,4,7,7a-tetrahydro-4,7-methanoindene-1,8-dione and ethanol; 4-carbethoxy-2,3,3a,4,5,6,7-heptachloro-3a,4-dihydroindone*

The product was prepared by allowing an ethanolic solution of octachlorotetrahydromethanoindenedione to stand at room temperature for several days. After recrystallization from carbon disulfide and heptane, the compound melted at ninety-five to ninety-six degrees centigrade.

*Analysis.*—Calcd. for $C_{12}H_5O_3Cl_7$: C, 32.36; H, 1.13; Cl, 55.73. Found: C, 32.32; H, 1.33; Cl, 55.9.

*Example 10.—4-carbethoxypentachloroindone*

The reduction of the above ester was conducted with sodium iodide in the manner employed for the methyl homolog, to obtain yellow crystals, M.P. one hundred one to one hundred two degrees centigrade (recrystallized from benzene-heptane). The infrared spectrum (Nujol mull) showed carbonyl bands at 5.60 and 5.70, and C=C stretching bands at 6.39 (shoulder at 6.43).

*Analysis.*—Calcd. for $C_{12}H_5O_3Cl_5$: C, 38.49; H, 1.35. Found: C, 38.65; H, 1.42.

*Example 11.—4-carbethoxyheptachlorohydrindone*

The chlorination of 4-carbethoxypentachloroindone was conducted as in the case of the methyl ester, to obtain 4 grams (47 percent of theory) of nearly colorless crystals, M.P. ninety-six to ninety-seven degrees centigrade (from heptane).

*Analysis.*—Calcd. for $C_{12}H_5O_3Cl_7$: Cl, 55.73. Found: Cl, 56.3.

*Example 12.—2-trichlorovinyl-4,5,6-trichloroisophthalic acid methyl ethyl ester*

(a) *From 4-carbomethoxypentachlorohydrindone.*—A solution of 1 gram of the carbomethoxyhydrindone was refluxed with 0.5 gram of soda ash in anhydrous ethanol for 80 minutes, cooled, diluted with water and the organic product was extracted with benzene, to obtain on evaporation of the benzene and two recrystallizations from aqueous methanol, 0.5 gram colorless needles, M.P. sixty-three to sixty-five degrees centigrade.

(b) *From 4-carbethoxypentachlorohyrindone.*—In an analogous manner, the carbethoxy ketone was treated with methanol and sodium carbonate to obtain colorless needles, M.P. sixty-three to sixty-five degrees centigrade. The products of (a) and (b) did not give a depressed mixed melting point, and had identical infrared spectra.

*Analysis.*—Calcd. for $C_{13}H_8O_4Cl_6$: C, 35.42; H, 1.83. Found: C, 35.37; H, 1.83.

*Example 13*

The reaction product of octachloro-3a,4,7,7a-tetrahydro 4,7-methanoindene-1,8-dione and methanol (i.e. 4-carbomethoxy-2,3,3a,4,5,6,7-heptachloro - 3a,4 - dihydroindone) was dissolved in ten times its weight of glacial acetic acid at ninety-five to one hundred degrees centigrade, and gaseous chlorine was passed into the hot solution over a period of 72 hours. The solution was then evaporated to dryness under reduced pressure, the residue was taken up in methylene chloride, washed with water, then evaporated to dryness and the residue was recrystallized from heptane to obtain nearly colorless crystals, M.P. one hundred one to one hundred two degrees centigrade, found by infrared comparison to be 4-carbomethoxyheptachloroindan-1-one (4 - carbomethoxyheptachlorohydrindone. Yield was eighty-two percent of theory.

*Example 14*

A ten percent solution of 4-carbomethoxy-2,3,3a,4,5,6,7-heptachloro-3a,4-dihydroindone (the reaction product of octachloro-3a,4,7,7a-tetrahydro-4,7-methanoindene-1,8-dione with methanol) in glacial acetic acid was heated for three days at one hundred degrees centigrade. The solvent was then evaporated off and the product analyzed by infrared absorption means. It was found to consist of about fifty percent 4-carbomethoxyheptachloroindan-1-one and fifty percent unchanged starting material. The components are separable by fractional crystallization from heptane.

*Example 15*

Dry crystalline 4-carbomethoxy-2,3,3a,4,5,6,7-heptachloro-3a,4-dihydroindone (reaction product of octachloro-3a,4,7,7a-tetrahydro-4,1-methanoindene-1,8-dione and methanol) was heated for 2½ days in a sealed glass vessel at one hundred forty degrees centigrade. The product was then found by infrared analysis to be principally 4-carbomethoxyheptachloroindan - 1 - one, with a small amount of perchloroindone present. The product may be purified by recrystallization from heptane, if desired.

Repetition of the experiment at two hundred degrees centigrade gave nearly all perchloroindone when a 2½ day heating period was used, but primarily 4-carbomethoxyheptachloroindan-1-one when a 10 minute heating period was used.

The compounds of the invention are, in general, surprisingly fungicidal and also to various degrees bactericidal and miticidal. Tomato plants inoculated with spores of *Alternaria solani*, the causative organism of Early Blight Disease, were sprayed with 0.04 percent aqueous dispersions of the product of Example 9. After one week, when unsprayed, inoculated check plants had developed severe symptoms (leaf lesions) of the disease, the sprayed plants were ninety-eight percent free of disease symptoms.

0.1 percent aqueous dispersion of 4-carbomethoxyheptachlorohydrindone in water was sprayed onto bean plants heavily infested with mites (*Tetranychus atlanticus*). After three days, 100 percent mortality of the mites was observed.

What is claimed is:

1. A composition of matter of the formula:

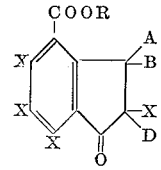

wherein R represents a monovalent organic radical selected from the group consisting of unsubstituted alkyl of 1 to 20 carbon atoms, and substituted alkyl of 1 to 20 carbon atoms, wherein the substituents are selected from the group consisting of lower alkenyl, lower alkoxy, and phenyl; A represents chlorine, bromine, or substituted amino substituent, such substituted amino substituent being selected from the group consisting of alkyl of 1 to 20 carbon atoms, and phenyl; X represents chlorine or bromine; and B and D represent chlorine or termini of a chemical bond connecting the carbon atoms to which B and D are joined.

2. A composition of matter of the formula:

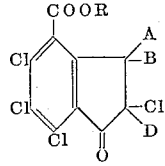

wherein R represents a monovalent organic radical selected from the group consisting of unsubstituted alkyl of 1 to 20 carbon atoms, and substituted alkyl of 1 to 20 carbon atoms, wherein the substituents are selected from the group consisting of lower alkenyl, lower alkoxy, and phenyl; A represents chlorine, bromine, or substituted amino substituent, such substituted amino substituent being selected from the group consisting of alkyl of 1 to 20 carbon atoms, and phenyl; and B and D represent chlorine or termini of a chemical bond connecting the carbon atoms to which B and D are joined.

3. A composition of matter of the formula:

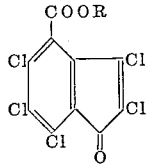

in which R is a monovalent organic radical selected from the group consisting of unsubstituted alkyl of 1 to 20 carbon atoms, substituted alkyl of 1–20 carbon atoms wherein the substituent is selected from the group consisting of lower alkenyl, lower alkoxy, and phenyl.

4. A composition of matter of the formula:

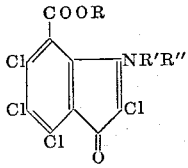

in which R is a monovalent organic radical selected from the group consisting of unsubstituted alkyl of 1 to 20 carbon atoms, substituted alkyl of 1–20 carbon atoms wherein the substituent is selected from the group consisting of lower alkenyl, lower alkoxy, and phenyl and R' and R" are selected from the group consisting of hydrogen, alkyl of 1–20 carbon atoms and phenyl.

5. A composition of matter of the formula:

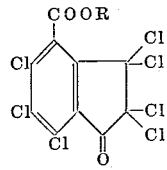

in which R represents a monovalent organic radical selected from the group consisting of unsubstituted alkyl of 1 to 20 carbon atoms, substituted alkyl of 1–20 carbon atoms wherein the substituent is selected from the group consisting of lower alkenyl, lower alkoxy, and phenyl.

6. A process for making a compound of claim 5 which comprises heating

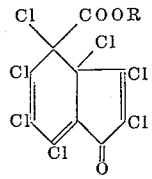

at a temperature in the range of 50 to 150 degrees centigrade, in the presence of chlorine.

7. A composition of matter of the formula:

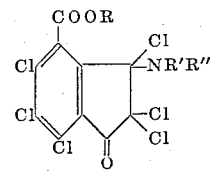

in which R, R' and R" are alkyl of 1–20 carbon atoms.

8. A composition of matter of the formula:

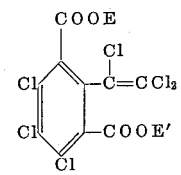

wherein E and E' are hydrogen or alkyl substituents.

9. The composition of claim 8 in which E is an alkyl substituent and E' is hydrogen.

10. The composition of claim 8 in which E and E' are alkyl substituents.

11. The composition of claim 8 in which E and E' are hydrogen substituents.

References Cited

UNITED STATES PATENTS

| | | | |
|---|---|---|---|
| 2,616,825 | 11/1952 | Gilbert et al. | 167—30 |
| 2,651,664 | 9/1953 | Ladd et al. | 260—658 |
| 2,671,043 | 3/1954 | Gilbert | 167—30 |
| 2,802,862 | 8/1957 | Senkbeil | 260—487 |
| 2,889,358 | 6/1959 | Guest et al. | 260—487 |
| 3,055,948 | 9/1962 | Hoch | 167—30 |
| 3,062,873 | 11/1962 | Iwai et al. | 260—487 |

OTHER REFERENCES

Groggins, Unit Processes in Organic Synthesis, McGraw-Hill, New York, 1952, pp. 205–207 and 247–249.

Karrer, Organic Chemistry, Elsevier, New York, 1950, p. 200.

Migrdichian, Organic Synthesis, Reinhold, New York, 2nd ed., 1957, p. 483.

Wagner et al., Synthetic Organic Chemistry, John Wiley and Sons, New York, pp. 665, 669, 672, 1953.

LORRAINE A. WEINBERGER, *Primary Examiner.*

M. O. WOLK, R. K. JACKSON, *Examiners.*

D. MOYER. T. L. GALLOWAY, *Assistant Examiners.*